July 2, 1968  H. L. PENBERTHY  3,391,237
ELECTRICAL CONTACT SYSTEM FOR CERAMIC ELECTRODES
Filed Feb. 2, 1967  2 Sheets-Sheet 1

INVENTOR
HARVEY LARRY PENBERTHY
BY  *LeBlanc & Shur*
ATTORNEYS

July 2, 1968 H. L. PENBERTHY 3,391,237
ELECTRICAL CONTACT SYSTEM FOR CERAMIC ELECTRODES
Filed Feb. 2, 1967 2 Sheets-Sheet 2
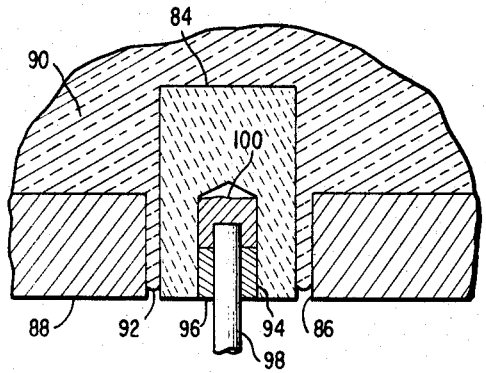
FIG. 6
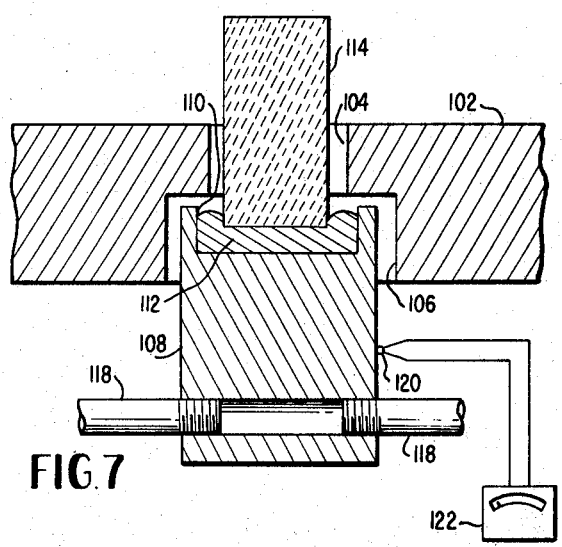
FIG. 7
FIG. 8
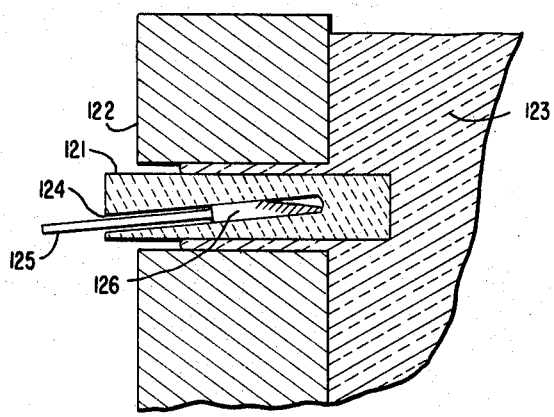
FIG. 10
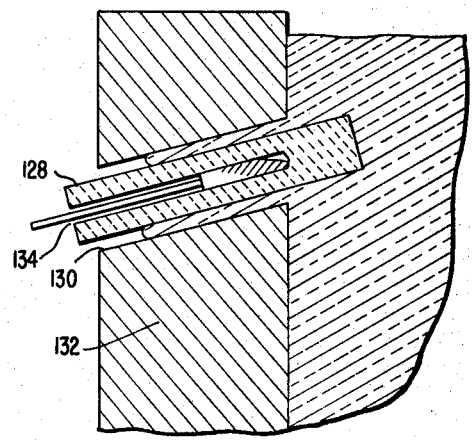
FIG. 9
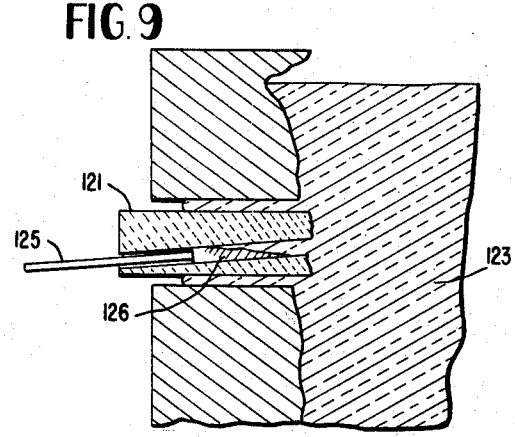
INVENTOR
HARVEY LARRY PENBERTHY
BY *LeBlanc & Shur*
ATTORNEYS 3,391,237
ELECTRICAL CONTACT SYSTEM FOR
CERAMIC ELECTRODES
Harvey Larry Penberthy, 5624 SW. Admiral Way,
Seattle, Wash. 98116
Filed Feb. 2, 1967, Ser. No. 613,477
19 Claims. (Cl. 13—6)

ABSTRACT OF THE DISCLOSURE

The arrangement comprises a connection between an electrical conductor and a refractory ceramic electrode for use in the electric heating of molten masses, such as glass, wherein contact between metal conductor and ceramic electrode is made by means of a metal which has been made molten to wet into good electrical contact with the electrode.

---

This invention relates to the electric melting of glass and more particularly relates to an improved refractory electrode for use in introducing electric heat into a molten glass mass.

The glass melting industry has long sought a refractory composition which is inert to molten glass and which will conduct a substantial current of electricity when raised to glass melting temperatures. One of the earliest electrode materials of this type which was actually tested is graphite either in block or bar form. This and similar materials, when used in contact with molten glass, exhibit the objectionable tendency to chemically reduce the glass constituents and to form seed.

More recently it has been proposed to utilize as a refractory ceramic electrode material a molded and fired body of tin oxide which usually contains minor amounts of other ingredients. Examples of electrode materials of this type are discussed in detail in United States patents to Mochel Nos. 2,467,144; 2,490,825; and 2,490,826. Electrodes of this type as currently manufactured contain small amounts of copper oxide and antimony oxide. The copper oxide is utilized as a mineralizer in order to cause the refractory body to shrink when fired, while the antimony oxide is one of several agents which may be introduced for the purpose of improving the conductivity of the refractory article.

Tin oxide electrodes of the foregoing type have an electrical resistance which is a function of temperature, the resistance being very high when the electrode is cool and reasonably low when the electrode is quite hot. When such electrodes are utilized in glass furnaces, the end of the electrode which projects into the glass bath is at a high temperature and possesses a good conductivity, while the other end of the electrode which projects outwardly through the wall of the furnace is, of course, much colder. This is an almost necessary condition inasmuch as if the electrode were hot along its entire length, the molten glass would tend to run along the side wall of the electrode and leak out of the furnace.

Because of the low temperature of the outer end of the electrode, its electrical resistance is quite high, so that when an electrical contact is made at this point, a significant portion of the voltage drop of the entire electrical heating circuit appears across the outer portion of the electrode. This condition materially reduces the efficiency of electric heating since the heat generated in the electrode which is outside of the glass bath is generally wasted and may even produce deleterious side effects.

The foregoing remarks concerning tin oxide electrodes apply generally to other conductive refractory ceramic oxide electrodes, such as those based on zirconium oxide and chromium oxide.

One attempt at solution of this problem has involved a silvering of the outside surface of the end of the electrode which protrudes from the furnace wall and to which the electrical supply is connected. This overcoating is generally formed by painting the surface with a standard ceramic silver paint and, after drying, reheating the refractory body, so that the silver coating is tightly adherent. This method is at least partially successful in that it makes electrodes of this type operable but suffers from several very severe limitations.

The primary difficulty is that silver melts at 1761° F., so that when the electrode rises above this temperature, the silver coating breaks its continuity and tends to pull together into tiny droplets, thereby rendering the coating useless. Unfortunately, the resistivity of the tin oxide refractories at the melting point of silver is still sufficiently high that the voltage drop from the end of the effective silver coating to the glass mass is not insignificant. As an example, in a small electric furnace melting soda lime glasses, the voltage across the outer ends of two electrodes extending into the glass mass may be 64 volts, while the voltage drop along the length of each electrode is approximately 1 volt. A simple computation shows that $\frac{1}{64}$ of the purchased power is wasted at each electrode. In addition to this, deleterious side effects are produced in that in one installation of this type the electrode heat dissipated in the furnace wall was sufficient to erode the wall and allow the glass to leak out of the furnace.

According to my invention, I have now found that tin oxide electrodes may be used with a remarkable efficiency if contact with the electrode is established by means of a molten mass of metal within the electrode. According to my invention, the molten metal within the electrode must be non-reactive with the tin oxide and must have a sufficiently high melting point to permit the use of a tin oxide electrode which is not unduly long.

With an electrode of this type utilized in a furnace arrangement similar to that discussed above, wherein the voltage drop along a conventional tin oxide electrode reached a value of 1 volt, the electrodes of my invention create a voltage drop along the electrode of only 0.1 volt. Thus, whereas the conventional tin oxide electrode system wasted 3% of the electric power in the electrode, a similar system utilizing the electrodes of my present invention would involve the remarkably low loss or waste of only about 0.3% of the supplied power.

In addition to this, it has been found that the new type electrode produces an unexpectedly great improvement in the current-carrying capacity of an electrode of a given dimension. This results in cooler electrode operation with a concomitant decrease in the danger of leakage of glass from the furnace. While the theoretical reason for this increase in current-carrying capacity and decrease in temperature is not completely understood, and I do not wish to be restricted to any theoretical explanation, it is possible that the molten metal completely wets the surface of the tin oxide electrode with which it is in contact and thus produces a much lower resistance electrical contact than has heretofore been obtainable by a fired-on thin silver coating.

Any molten metal which is non-reactive with the tin oxide electrode may be used to establish the electrical contact and silver and gold have been found satisfactory. To a lesser extent, lead, copper and tin may also be utilized, but have some disadvantages. The melting points of lead and tin are low, so that the opening of the contact hole must be pointed upwardly or the temperature at the opening must be kept colder than the melting point of said metals by special cooling means. Further, all three metals are subject to oxidation, and sealing means must be provided to exclude oxygen.

Contact with the molten metal may be made by means of a solid bar or strap which may itself be formed of silver or gold. For economy, however, the solid metal lead-in may be replaced with an electrically conductive heat resisting material, such as stainless steel, with the stainless steel being maintained below its oxidation temperature by means of suitable cooling. Copper may also be used when the same precautions are taken. Alternatively, the copper may be clad with stainless steel or may be silver plated.

It is accordingly a primary object of the present invention to provide improved refractory ceramic electrodes for use in the introduction of electrical heat into molten glass masses.

It is another object of this invention to provide an improved tin oxide type electrode for use in the electric melting of glass.

It is another object of this invention to provide an improved tin oxide type refractory electrode which may be used in the electric melting of glass with an increased efficiency and higher current-carrying capacity.

It is still another object of the present invention to provide an improved tin oxide ceramic electrode which is connected to an outside source of electric power by means of a solid connector which is in electrical contact with a molten mass of metal within the electrode.

It is a further object of the invention to provide a high conductivity, low loss ceramic electrode wherein electrical contact with the electrode is made by means of a molten metal contained within the electrode, which metal is non-reactive with the ceramic material of the electrode.

These and further objects and advantages of the invention will become more apparent upon reference to the following specification and claims and appended drawings wherein:

FIGURE 6 is a vertical section through a furnace floor showing a portion of another embodiment of an electrode constructed according to the invention;

FIGURE 7 is a vertical section through a furnace floor showing an electrode constructed according to a still further embodiment of the invention;

FIGURE 8 is a vertical section through a furnace side wall showing an electrode constructed according to a still further embodiment of the invention;

FIGURE 9 is a view of the same embodiment of the invention as is seen in FIGURE 8 showing the effect of electrode erosion; and FIGURE 10 is a vertical section through a furnace side wall showing an electrode construction according to still another embodiment of the invention.

Figure 1:
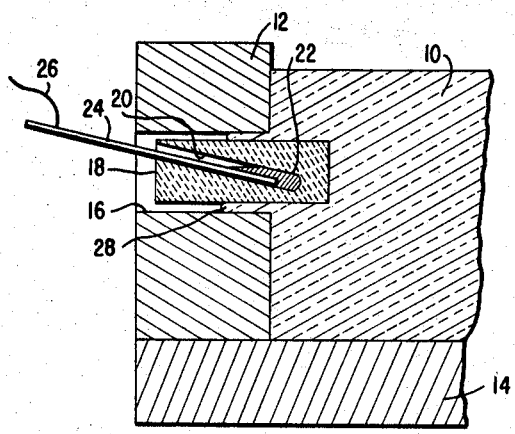
FIGURE 1 is a vertical section through a portion of a glass furnace showing an electrode constructed according to one embodiment of the invention.

Referring to FIGURE 1, there is shown a molten mass of glass 10 confined within the side and bottom walls 12 and 14 of a glass furnace. The side wall 12 is provided with an electrode opening 16 which receives a cylindrical electrode 18 of a tin oxide refractory ceramic of the types disclosed in Mochel Patents Nos. 2,467,144; 2,490,825; and 2,490,826. One end of electrode 18 extends into the glass mass while its other end terminates within the furnace wall 12. The outer end of the electrode is bored at 20 and the bore hole is inclined with respect to the horizontal and terminates short of the inner end of the electrode. A molten mass of silver 22 is received within the bore 20 and is retained therein by reason of the inclination of the bore.

A solid bar 24, which may also be silver, extends into the bore 20 into the molten mass of silver 22. An electrical connection 26 of any suitable type is made to the bar 24 in a conventional manner. When silver is utilized as the molten metal 22 within the electrode 18, its melting point is high enough so that the body of silver becomes frozen or solid toward its outward end and thus becomes integral with the bar 24, thereby making it possible to utilize a relatively short electrode 18. It will be apparent that the tin oxide electrode body to the left of the molten mass of tin in FIGURE 1 carries no substantial electric current, so that its temperature drops rapidly from that which exists at the inner or submerged end of the electrode. This being the case, the molten mass of glass 10 enters the furnace opening 16 as shown at 28 but solidifies or freezes long before it approaches the outer end of the furnace wall because of the steep temperature gradient which exists along the length of the electrode. Where the electrode is maintained at a higher temperature throughout its length, this glass has a tendency to seep through the electrode opening 16 and to leak out of the furnace.

Figure 2:
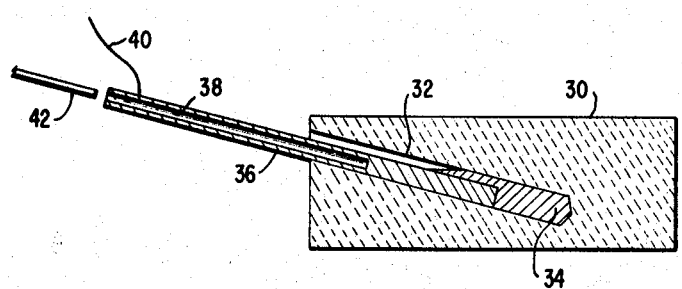
FIGURE 2 is a vertical section showing a second embodiment of an electrode constructed according to the invention.

The use of silver as the lead-in strap or connection is obviously expensive and it is desirable to be able to utilize a metal of a considerably lower cost. FIGURE 2 shows an embodiment of the invention which makes such an arrangement possible.

Referring to FIGURE 2, there is shown a vertical cross section of a tin oxide electrode 30 having an inclined bore 32 therein and a body of molten silver 34 at the lower end thereof. Inserted into the molten silver is a stainless steel rod 36 having a longitudinal bore 38 therein. A suitable electrical connection 40 is fastened to the outer end of the rod 36 in any suitable manner for supplying electric power to the electrode. Immediately adjacent the outer end of the rod 36 at the opening of bore 38 is a coolant supply device 42 which may be an air or water nozzle and which maintains the stainless steel below its oxidation temperature. It will be obvious to those skilled in the art that other conventional cooling arrangements may be used.

Figure 3:
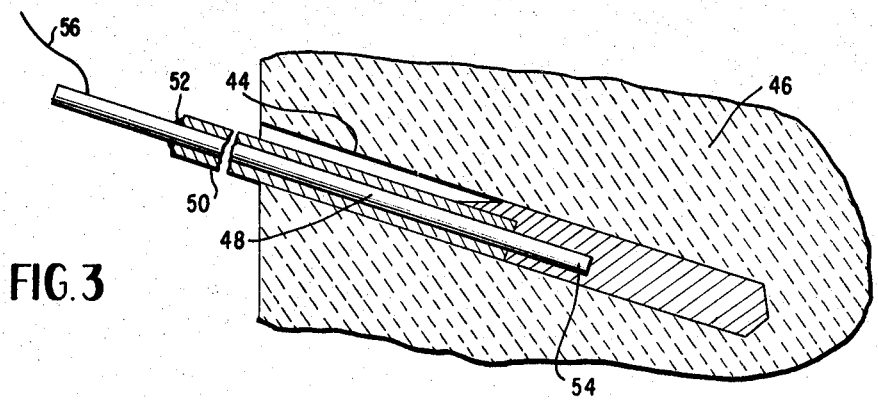
FIGURE 3 is a vertical section showing details of a solid lead-in connector according to another embodiment of the invention.

Referring to FIGURE 3, there is shown still a further embodiment of a lead-in wire inserted into an inclined bore 44 in a tin oxide electrode 46. This lead-in wire consists of a copper wire 48 which is clad with a stainless steel tube 50 brazed to the copper wire 48 at 52. A suitable electrical connection 56 is made to the outer end of the copper conductor. While the embodiment illustrated in FIGURE 3 shows an inclined bore in the electrode, it is also intended that a horizontal bore may be used, the freezing or solidification of the molten metal preventing its escape.

Figure 4:
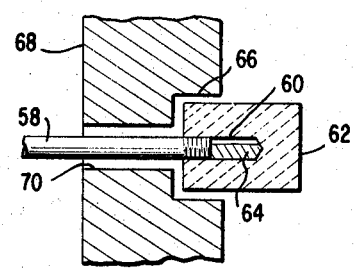
FIGURE 4 is a vertical section through a portion of a furnace wall showing another embodiment of an electrode constructed according to the invention.

Referring to FIGURE 4, there is shown one method of economizing on the use of tin oxide in the electrode itself. According to this embodiment of the invention, a shank of heat resisting metal such as stainless steel 58 is screw-threadedly engaged in a bore 60 in a tin oxide electrode 62. The bore 60 contains molten silver 64 and the electrode itself is received within a counter bore 66 in a furnace wall 68. The conducting shank 58 extends through a further reduced diameter aperture 70 in the furnace wall.

Figure 5:
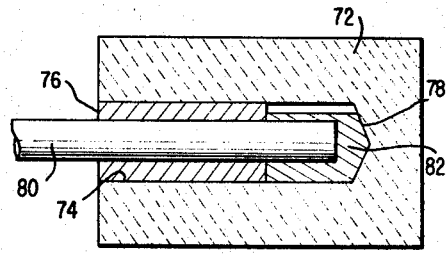
FIGURE 5 is a vertical section through a ceramic electrode constructed according to still another embodiment of the invention.

The size of the hole or bore in the tin oxide electrode for use with the molten silver is not critical and holes of 5/16" diameter have been found quite satisfactory. In some instances, it is found desirable to enlarge the inner end of the hole to increase the area of contact between the silver and the tin oxide. In such instances, the major portion of the bore whose side walls are colder than the melting point of the silver are plugged with a stainless steel or refractory porcelain tube to reduce the amount of silver required. Referring to FIGURE 5, there is shown an electrode constructed in this manner. The electrode body 72 contains a bore 74 which may, for instance, be one inch in diameter. Received within this bore is a stainless steel or refractory porcelain tube 76 which extends into the bore but terminates short of its end 78. The tube 76 receives the conducting member 80, which is surrounded by the molten silver 82. A construction of this type requires only a limited size tin oxide electrode and a minimum amount of molten silver.

While the electrode arrangements of FIGURES 1–5 have involved generally horizontal electrodes, it is also possible to use electrodes oriented up through the bottom of the furnace. One such arrangement is shown in FIGURE 6 and may be recognized as a vertical disposition of the type of electrode illustrated in FIGURE 5. Here the electrode body 84 is disposed in a vertical opening 86 in the furnace floor 88. The molten glass mass 90 freezes at 92 to seal the floor.

The electrode body contains a bore 94 which, in the illustrated embodiment, terminates approximately at the floor of the furnace, although it is contemplated that the bore may extend upward above the floor of the furnace. Received within the bore is a stainless steel or refractory porcelain tube 96 which terminates short of the bore end. The tube 96 receives the conducting member 98, which is surrounded by molten silver 100. It is to be understood that the tube 96 is not essential to this embodiment of the invention so long as the silver extends to a sufficiently low point in the electrode that its lower end remains solid and does not melt. Actually, it is not necessary to maintain the silver in any embodiment completely molten since the silver, once having been molten and having wetted the tin oxide, continues to make good contact. However, the temperature of the silver must be maintained above room temperature since at that point the differential expansion between the silver and tin oxide shears the connection. When this occurs, remelting is necessary to restore good contact.

A further and somewhat different embodiment of the invention is shown in FIGURE 7. Referring to that figure, the furnace floor 102 is bored at 104 and counter-bored at 106. A stainless steel bar 108 extends into the counter-bore and is bored so that a cup 110 is formed in its upper end. The cup is partly filled with molten silver 112 and the tin oxide electrode 114 rests on the silver. The lower end of the stainless steel bar 108 may be cross-bored at 116 to receive a supply of fluid coolant through pipes 118.

When the furnace is heated for the first time, a torch is applied to the stainless steel bar 108 and the temperature of the bar is monitored by means of the thermocouple 120 and pyrometer 122. When the temperature reaches the melting point of silver, the silver 112 melts and the tin oxide electrode 114 sinks into the molten metal, thus making excellent contact.

Referring to FIGURE 8, there is shown still another embodiment of the invention wherein the bore in the electrode is inclined upwardly rather than downwardly as in the embodiments of FIGURES 1 and 2. In FIGURE 8, electrode 121 is located in an aperture in the furnace wall 122 enclosing glass 123. Here the bore 124 in electrode 121 is inclined upwardly inwardly. Metal bar 125 is inserted in the bore 124 at the time of starting the furnace. When the temperature is sufficiently high, the end of bar 125 melts, forming a pool of liquid 126. The pool of liquid extends outwardly to a point where the temperature is at the freezing point of the metal.

FIGURE 9 shows the same furnace after erosion of the wall and electrode by the molten glass. The inward end of bore 124 is now exposed to the glass. In spite of such exposure, molten metal 126 does not flow out into the furnace, and good contact is retained.

It may be noted that the level of molten metal 126 is shown lower than in FIGURE 8. If the reaction product of the molten metal with the glass 123 is not detrimental, no attention need be paid to the level of the molten pool. However, if such reaction product is detrimental, the level of molten metal 126 can be lowered by withdrawing metal rod 125, accompanied by external heating of the end of electrode 121.

According to a still further embodiment of the invention, the bore or hole in the electrode may be axial but the electrode may be mounted in the furnace wall on an incline. Such an arrangement is shown in FIGURE 10. Referring to that figure, there is seen an electrode 128 mounted in an opening 130 in a furnace side wall 132. The electrode is provided with an axial bore 134 but is upwardly inclined to attain the same result as the embodiment of FIGURES 8 and 9.

It will be apparent from the foregoing that tin oxide electrodes constructed according to this invention possess an efficiency and current carrying ability greatly in excess of those used heretofore and at the same time eliminate various disadvantages which had been encountered previously. Thus, the leakage of glass which has been occasioned by the excessive temperature of operation of prior tin oxide electrodes is eliminated and the amount of tin oxide which must be used in the electrode is reduced. Any expensive metal such as silver or gold which is utilized in making the contact may be recovered after the electrode is discarded, so that its cost is not an item of expense with respect to each individual electrode which must be replaced.

While this invention has been described in terms of electrodes containing single openings, it is to be understood that plural openings and electrical connections may be used and are not intended to be excluded by claims which specifically mention only one opening and connector. In a like vein, while single openings have been shown, it is to be understood that any such openings may be in any of a plurality of shapes. Thus, instead of a centrally and axially disposed opening, it may be advantageous to utilize an annular opening with solid material along the axis of the electrode. Further, while primarily and most advantageously useful at the present time with molten glass, it is to be understood that the electrodes of the invention may also be used with other materials meltable at high temperatures, such as metals and salts, referred to in the claims as molten masses. Still further, while the electrodes illustrated in the drawings have extended through non-conductive walls, it is contemplated and within the purview of the invention to form parts of walls or entire walls of conductive ceramic with provision for connecting the individual wall blocks to the electrical supply in the manner of this invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A refractory ceramic electrode for use in the electric heating of molten masses comprising a refractory ceramic electrode body adapted to have a first portion thereof contacting the molten mass and a second portion which contacts the electrical supply, said electrode having an opening in said second portion extending toward said first portion, a body of metal in said opening which is non-reactive with the material of said refractory ceramic electrode at the temperature of said molten mass and which is itself molten at said temperature, and an electrical connector extending into said opening and into contact with said body of metal.

2. A refractory ceramic electrode for use in the electric heating of molten masses, said electrode having a high electrical resistivity at room temperature and a relatively low electrical resistivity at the temperature of said mass, comprising a refractory ceramic electrode body adapted to have one portion thereof contacting the molten mass and another portion contacting the electrical supply, said electrode having an opening in said other portion extending into said one portion, a body of metal in said opening which is non-reactive with the material of said refractory ceramic electrode at the temperature of said molten mass and which is itself molten at said temperature, and an electrical connector extending into said opening and into contact with said body of metal.

3. A refractory ceramic electrode for use in the electric heating of molten masses, said electrode having a high electrical resistivity at room temperature and a relatively low electrical resistivity at the temperature of said mass, comprising a refractory ceramic electrode body adapted to have one portion thereof contacting the molten mass and another portion contacting the electric supply, said electrode having a bore extending from said other portion into said one portion, a body of metal in said bore in said one portion, said metal being non-reactive with the material of said refractory ceramic electrode at the temperature of said molten mass and having a melting point below said temperature, and an electrical connector extending into said bore into contact with said body of metal.

4. A fired tin oxide electrode for use in the electric heating of molten glass, said electrode having a high electrical resistivity at room temperature and a relatively low electrical resistivity at the temperature of said glass, comprising a fired tin oxide electrode body adapted to have one portion thereof immersed in molten glass and another portion exposed, said electrode having a bore extending from said exposed portion into said immersed portion and terminating in said immersed portion in a blind end, a body of metal in said bore at said blind end thereof, said metal being non-reactive with said electrode body at the temperature of said molten glass and having a melting point below said temperature, and an electrical connector extending into said bore into contact with said body of metal.

5. An electrode as set out in claim 3 wherein said bore is inclined with respect to the longitudinal axis of said electrode body whereby said body of metal is retained in said bore when in a molten condition.

6. An electrode as set out in claim 2 including means for cooling the protruding end of said electrical connector.

7. An electrode as set out in claim 3 wherein the portion of said body of metal in contact with said electrical connector is solid and unmolten.

8. An electrode as set out in claim 3 wherein said electrical connector is clad with a material having a higher oxidation temperature than said connector.

9. An electrode as set out in claim 3 wherein said body of metal is formed of a metal selected from the group consisting of gold, silver, lead, copper, and tin.

10. An electrode as set out in claim 3 wherein the diameter of said bore at its end in said one portion is greater than the diameter of said bore adjacent said end.

11. An electrode as set out in claim 3 wherein said bore is of a uniform diameter and has a sleeve inserted therein to form said lesser diameter portion.

12. An electrode as set out in claim 3 wherein said connector screw threadedly engages said electrode body and seals said body of metal therein.

13. A refractory ceramic electrode member for use in the electric heating of molten masses, said electrode member having a high electrical resistivity at room temperature and a relatively low electrical resistivity at the temperature of said mass, said member comprising a refractory ceramic electrode body adapted to have one portion thereof contacting said molten mass and another portion contacting the electric supply, a metal member unimmersed in said mass, said members having facing surfaces, and a body of metal between said facing surfaces which is non-reactive with the material of said refractory ceramic electrode at the temperature of said molten mass, said metal having been molten to wet into good electrical contact with said ceramic electrode and being in good electrical contact with said metal member.

14. An electrode as set out in claim 13 wherein said electrode member is bored and receives said metal member.

15. An electrode as set out in claim 13 wherein said metal member is bored and receives said electrode member.

16. An electrode as set out in claim 13 wherein said body of metal is formed of a metal selected from the group consisting of gold, silver, lead, copper and tin.

17. An electrode as set out in claim 16 wherein said electrode member is substantially vertically disposed.

18. An electrode as set out in claim 16 wherein said electrode member is substantially horizontally disposed.

19. An electrode as set out in claim 16 wherein said metal member is provided with cooling means.

References Cited

UNITED STATES PATENTS

| | | | |
|---|---|---|---|
| 2,592,972 | 4/1952 | Muehlenkamp | 13—18 X |
| 2,594,973 | 4/1952 | Muehlenkamp | 13—18 X |
| 2,940,951 | 6/1960 | Ruskin | 75—84 X |
| 3,125,441 | 3/1964 | Lafferty et al. | 75—84 X |
| 3,119,717 | 1/1964 | Veres | 106—57 X |

BERNARD A. GILHEANY, *Primary Examiner.*

H. B. GILSON, *Assistant Examiner.*